United States Patent
Kessel

[19]

[11] Patent Number: 6,036,590
[45] Date of Patent: Mar. 14, 2000

[54] DEVICE AND METHOD FOR DEBONING POULTRY PARTS

[75] Inventor: Ad Kessel, 's Gravezande, Netherlands

[73] Assignee: F.P. M. International, Hoevenen, Belgium

[21] Appl. No.: 09/310,983

[22] Filed: May 13, 1999

[51] Int. Cl.$^7$ ................................................... A22B 17/04
[52] U.S. Cl. ........................................... 452/138; 452/136
[58] Field of Search .................................. 452/138, 135, 452/136, 127

[56] References Cited

U.S. PATENT DOCUMENTS

| | | | |
|---|---|---|---|
| 4,216,565 | 8/1980 | Volk et al. | 452/136 |
| 4,377,884 | 3/1983 | Viscolosi | 452/136 |
| 4,488,332 | 12/1984 | Atteck et al. | 452/136 |
| 4,811,456 | 3/1989 | Heuvel | 452/136 |
| 4,944,067 | 7/1990 | Kulishev et al. | 452/138 |
| 5,090,940 | 2/1992 | Adkison | 452/136 |
| 5,173,076 | 12/1992 | Hazenbroek | 452/138 |
| 5,267,891 | 12/1993 | Cresson et al. | 452/138 |
| 5,277,649 | 1/1994 | Adkison | 452/138 |
| 5,782,685 | 7/1998 | Hazenbroek | 452/138 |

*Primary Examiner*—Willis Little
*Attorney, Agent, or Firm*—Jacobson, Price, Holman & Stern, PLLC

[57] ABSTRACT

A deboning device for poultry: (i) has deboning units mounted along an endless chain to be moved in longitudinal direction along a processing path, each deboning unit extends in cross direction of the endless chain, and at one end of the unit there is a meat stripper disc assembly with a meat stripper disc having an aperture for receiving the bone of the poultry part therethrough in longitudinal direction of the bone and stripping the meat from the bone, at the other opposing end of the unit there is a bone pusher assembly for displacing the bone towards and through the aperture of the meat stripper disc, and at one side of the unit facing the meat stripper disc there is a carrier for carrying the poultry part to be deboned; (ii) has structure for guiding the bone pusher assembly towards the meat stripper disc into engagement with the poultry part, and (iii) has at least one deboning position, which deboning position contains the structure for guiding the bone pusher assembly towards the meat stripper disc, which disc is made of a flexible material, in which bone pusher assembly a pusher rod is slidably mounted, which pusher rod has a front end with a diameter that is larger than the diameter of the aperture of the meat stripper disc, which pusher rod is provided to cooperate with structure for moving the pusher rod to a position where the front end of the pusher rod is in contact with the meat stripper disc, and the meat stripper disc is elastically deformed in such a way that part of it extends beyond the meat stripper disc assembly and the bone is displaced substantially completely through the aperture of the meat stripper disc; and (iv) has, at a position in the vicinity and upstream of the deboning position, a first obstruction positioned substantially perpendicular to the processing path stopping the bone after it has passed through the meat stripper disc and for forcing the bone to move out of the aperture of the meat stripper disc.

15 Claims, 4 Drawing Sheets

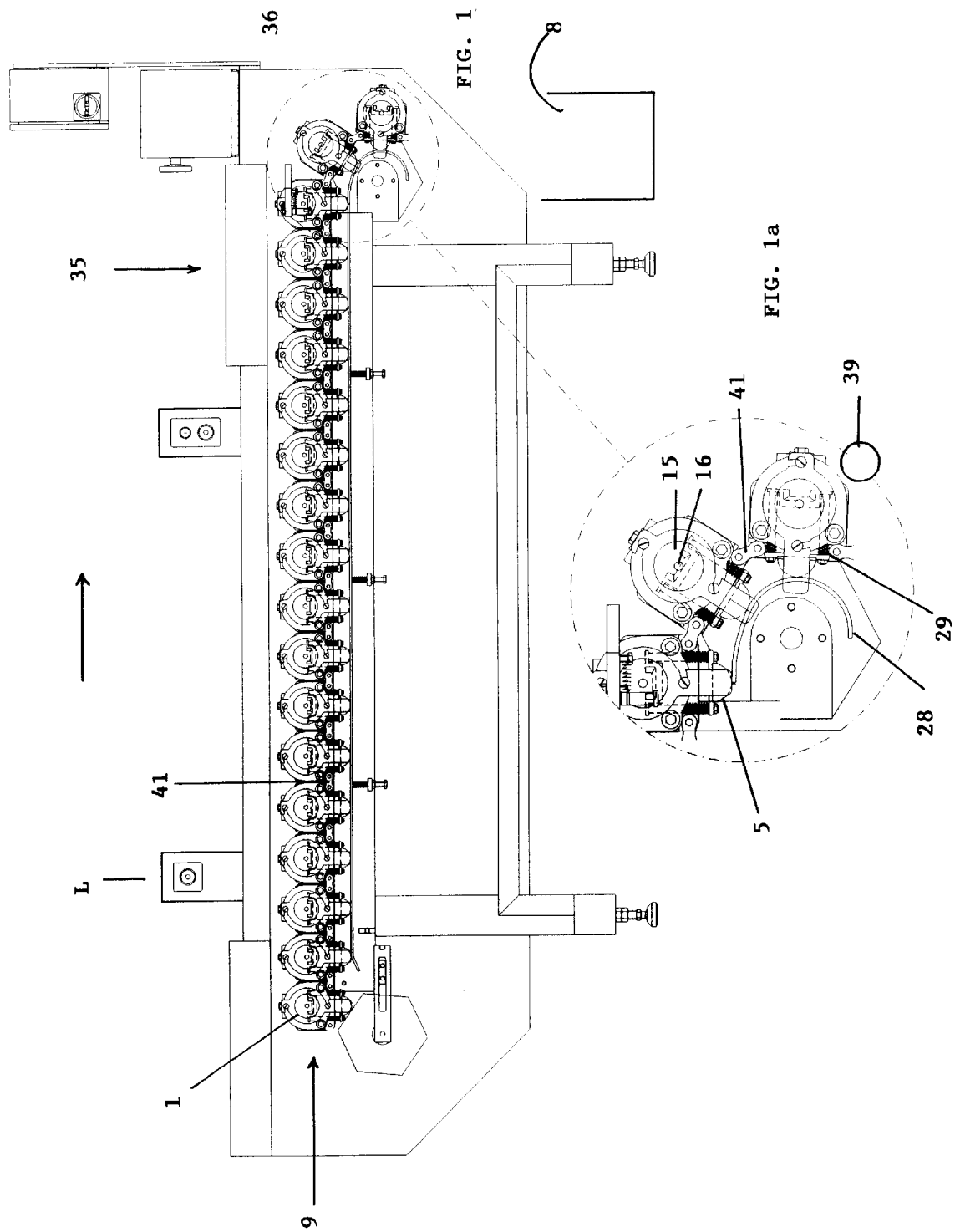

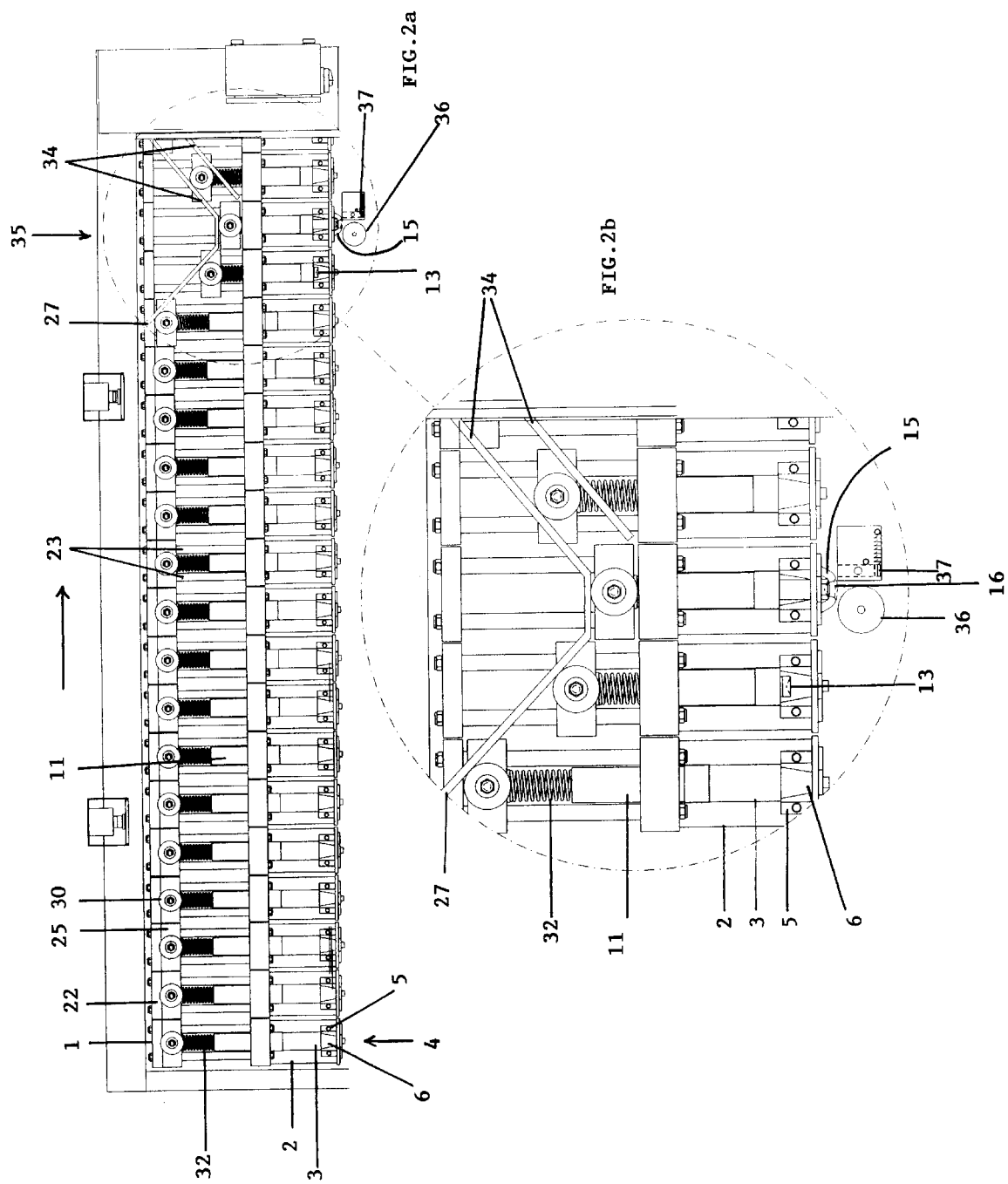

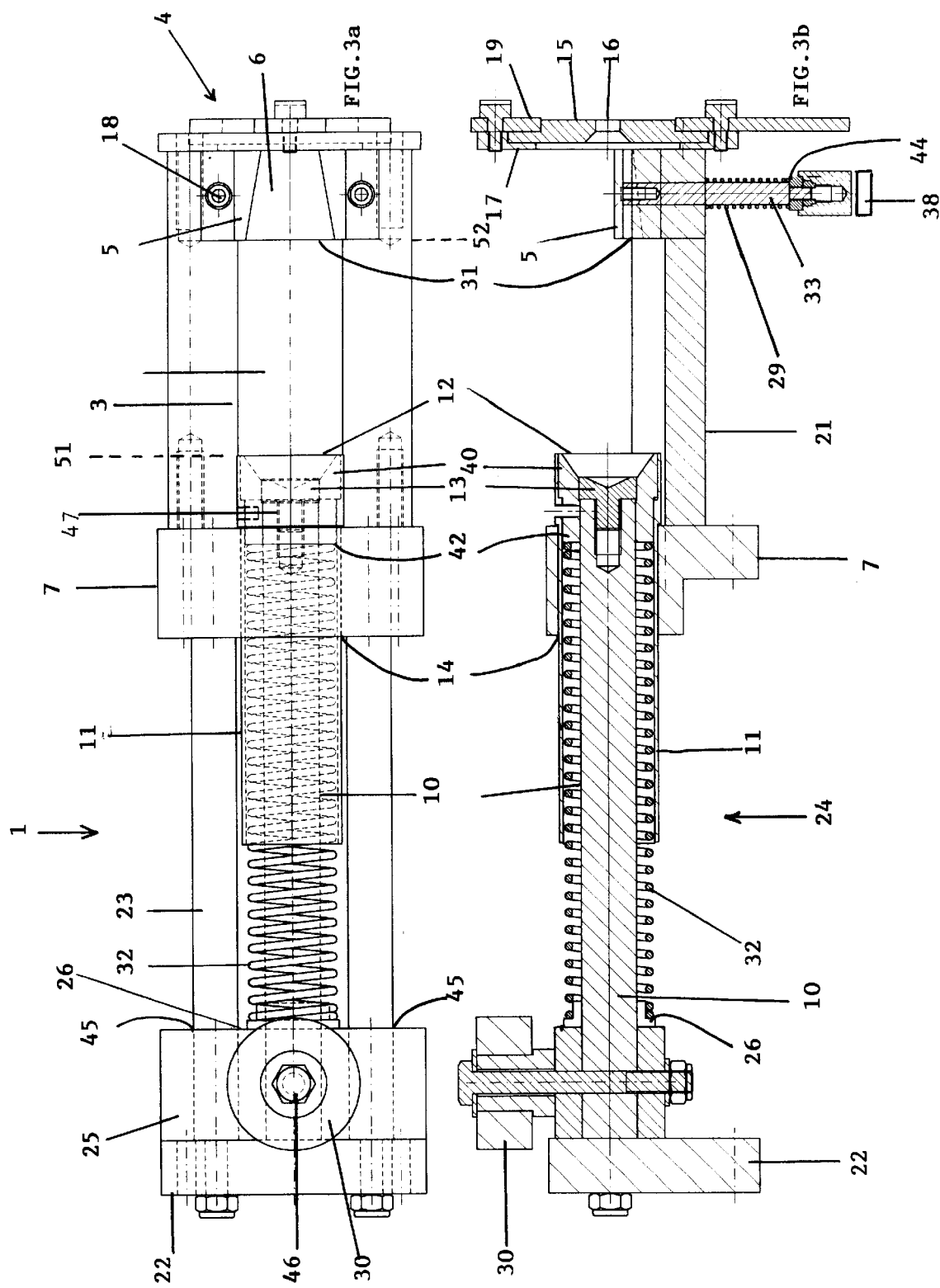

DEVICE AND METHOD FOR DEBONING POULTRY PARTS

The present invention relates to a device and a method for removing the bones from animal parts, in particular poultry thighs, said device comprising a plurality of deboning units mounted along an endless chain, which endless chain is provided to be moved in longitudinal direction along a processing path, whereby each deboning unit extends in cross direction of the endless chain and comprises at a first end a meat stripper disc assembly with a meat stripper disc, which meat stripper disc contains an aperture for receiving the bone of the poultry part therethrough in longitudinal direction of the bone and stripping the meat from the bone, which deboning unit comprises at a second end opposite said first end, a bone pusher assembly for displacing the bone towards and through the aperture of the meat stripper disc, which deboning unit comprises at a side facing the meat stripper disc a carrier for carrying the poultry part to be deboned, which deboning device further comprises means for guiding the bone pusher assembly towards the meat stripper disc (15) into engagement with the poultry part.

From the art, a plurality of methods and devices for removing the bones from the poultry parts are known. In U.S. Pat. No. 5,173,076 a device is disclosed which comprises a pair of spaced apart chain conveyors for carrying a plurality of deboning units mounted on the conveyors, along a substantially endless processing path. Each deboning unit comprises a carrier tray assembly for receiving the poultry parts that need be deboned, a bone pusher assembly and a meat stripper disc assembly. The meat stripper disc assembly is mounted at one end of the carrier tray and comprises a flexible stripper disc supported within a rigid collar. Approximately in the center of the meat stripper disc an aperture is provided for receiving the poultry bones there trough. At the opposite end of the carrier tray, the bone pusher assembly is mounted. Each bone pusher assembly comprises a hollow pusher sleeve with an open front end, in which a pusher rod is slidably mounted. As the pusher sleeve is displaced towards the meat stripper disc, the front end of the pusher sleeve engages the poultry thigh, urges the poultry thigh towards the meat stripper disc, and forces the thigh bone through the aperture of the meat stripper disc. As the open front end of the pusher sleeve contacts the meat stripper disc, the pusher rod is urged towards the meat stripper disc to engage the thigh bone. To ensure that the thigh bone is urged completely through the aperture of the meat stripper disc, the tapered front end of the pusher rod is urged through the aperture of the meat stripper disc.

The device disclosed in U.S. Pat. No. 5,173,076 however has the disadvantage the meat stripper disc, and particularly the aperture provided therein, shows a high degree of wearing and needs be replaced regularly, because the pusher rod is first pushed through the aperture so as to urge the bone there through, and subsequently retracted through the aperture after the deboning has been completed.

It is the aim of the present invention to provide a device wherein the life time of the meat stripper disc can be prolonged.

This is achieved with the present invention in that the deboning device comprises at least one deboning position, which deboning position comprises the means for guiding the bone pusher assembly towards the meat stripper disc, which meat stripper disc is made of a flexible material, in which bone pusher assembly a pusher rod is slideably mounted, which pusher rod has a front end with a diameter that is larger than the diameter of the aperture of the meat stripper disc, which pusher rod is provided to co-operate with the means for moving the pusher rod to a position where the front end of the pusher rod is in contact with the meat stripper disc and the meat stripper disc is elastically deformed in such a way that part of it extends beyond the meat stripper disc assembly and the bone is displaced substantially completely through the aperture of the meat stripper disc, whereby the deboning device comprises at a position in the vicinity of and upstream the deboning position, a first obstruction which is positioned in a direction substantially perpendicular to the processing path for stopping the bone after it has been displaced substantially completely through the meat stripper disc and forcing the bone to move out of the aperture of the meat stripper disc.

In the deboning device of this invention, the pusher rod has a diameter which is larger than the diameter of the aperture provided in the meat stripper disc, so as to prevent that the pusher rod can be urged through the aperture. Since the pusher rod is not urged through the aperture, the wearing of the in the meat stripper disc due to frequent contact with the pusher rod can be avoided.

Although the pusher rod is not urged through the aperture of the meat stripper disc, a complete removal of the meat can still be achieved, without necessitating the use of means for gripping the bone as soon as it is displaced through the aperture of the meat stripper disc. The inventor is of the opinion that this must be attributed to the specific co-operation occurring between the bone pusher assembly, the meat stripper disc and the first obstruction provided in the device of this invention. Namely, the deboning device of this invention comprises a pusher assembly with a pusher rod which is displaceable towards the meat stripper disc until it contacts the meat stripper disc, and from thereon to a position beyond the non deformed position of the meat stripper disc, thus deforming the meat stripper disc and prolonging the distance over which the bone is pushed out of the meat. In a direction substantially perpendicular to the advancing direction of the processing path, a first obstruction is provided so as to stop the bone that extends throughout the aperture of the meat stripper disc, while the deboned meat is still being moved by the conveyor belt. The obstruction causes the bone to be moved or rotated out of the aperture of the meat stripper disc and to complete the removal of any meat remaining on the bone. This first obstruction is provided at a position upstream the processing path, preferably right beyond the position of the means for advancing the bone pusher assembly towards the meat stripper disc.

According to a first preferred embodiment of this invention, the deboning unit preferably comprises means for adjusting the position of the poultry part with respect to the meat stripper disc in height direction of the deboning unit. In that way the distance in height direction of the deboning unit, between the poultry part and the aperture of the meat stripper disc can be varied and adapted to the size of the poultry part that needs to be deboned, so as to ensure that the bone can be directed towards and through the aperture in the meat stripper disc, independent of the size of the poultry part.

The means for adjusting the position of the poultry part with respect to the meat stripper disc in height direction of the deboning unit preferably comprise in the vicinity of the meat stripper disc, a socket for carrying at least part of the poultry part. The socket is slideably mounted in the carrier in height direction of the deboning unit, so as to allow the deboning unit to be adapted to the size of the poultry part and to allow a proper deboning of the poultry parts independent of the size of thereof. Thereby the socket is provided to co-operate with a third guiding in the vicinity of the deboning position, i.e. at a position downstream the deboning position or at the deboning position, for displacing the socket in height direction of the deboning unit. Preferably, the socket also comprises a groove which tapers towards the meat stripper disc for guiding the bone towards the aperture in the meat stripper disc.

The bone pusher assembly of the device of the present invention comprises a hollow centering tube with a hollow inwardly tapering front end for tilting the bone and centering the bone in the hollow front end of the centering tube, so as to ensure that the bone is directed towards the aperture of the meat stripper disc. In the centering tube, the pusher rod is slideably mounted so as to allow more fragile bones also to be picked up and guided towards the meat stripper disc.

The means for guiding the bone pusher assembly towards the meat stripper disc assembly, provided at the deboning position preferably comprise a first guiding for guiding the centering tube and the pusher rod from a first start position to a first end position, and the pusher rod from the first end position to a second end position which second end position corresponds to a position whereby the meat stripper disc is elastically deformed. After the second end position, the first guiding transfers to a second guiding for retracting the pusher rod from the meat stripper disc. Upon the backward retraction of the pusher rod, towards its start position, away from the meat stripper disc, the flexible disc collapses in backward direction, thereby exerting a forward projecting force to the bone, following which the bone is projected through the aperture of the meat stripper disc and any remaining last traces of meat are stripped from the bone. Thus a virtually complete removal of meat from the bone can be achieved without having to displace the pusher rod throughout the aperture disc. Thereby, the socket may comprise opposite a side facing the meat stripper disc, an upright rim which corresponds to the end position of the pusher sleeve.

To ensure a proper deboning of poultry parts with widely varying sizes, the pusher rod may comprise an extendible part which is preferably displaceable to a position within the aperture of the meat stripper disc, or even beyond the aperture of the meat stripper disc. To improve the grip to the bone, the pusher rod preferably comprises an inwardly tapering front end, the surface of which is rough and/or is provided for one or more pins which may engage the bone.

The deboning device of this invention further preferably comprises a second means for separating any meat or tendons or ligaments remaining between the bone and the meat that has been removed from the bone. Those means can for example be a second obstruction or a cutting means upstream of the moving direction of the conveyor belt.

According to another preferred embodiment of this invention, at a position upstream the deboning position of the processing path, preferably a fourth guiding is provided for displacing the socket in height direction of the deboning unit so as to force the meat to leave the carrier and allow an automatic removal of the meat from the device. In case the meat sticks to the carrier, further means, preferably a paddle wheel, are provided for picking up the meat from the carrier and transporting the meat towards the meat collector.

A further preferred embodiment includes that the guiding means of the deboning device of this invention comprise a guiding block to which the pusher rod is connected. The pusher rod is preferably surrounded over at least part of its length, more preferably over substantially its entire length, by a spring, which is clamped between the guiding block and a rim in the vicinity of the front end of the centering tube. The clamped positioning of the spring ensures on the one hand that the bone pusher assembly is advanced towards the poultry part so as to clamp the poultry part between the bone pusher assembly and the meat stripper disc, and on the other hand that a clamping force is exerted to the bone of the poultry part to hold the bone and direct it towards the aperture in the meat stripper disc. Upon the displacement of the bone pusher assembly, the spring is gradually compressed. In that way it can be achieved that the pressure exerted to the bone upon deboning is gradually increased, thus allowing to reduce the risk to a breaking of the bone.

The guiding means further comprise third means connected to the guiding block. The third means are provided to co-operate with the first guiding for guiding the centering tube from its first start position to its first end position, which preferably corresponds to the position where the front end of the centering tube contacting the upright rim of the socket. The third means further co-operate with the first guiding to move the pusher rod from this position to its second end position, whereby the meat stripper disc is elastically deformed in the advancing direction of the pusher rod. This means in fact that the pusher rod is slideably mounted within the centering tube. At the position where the first guiding stops and the bone has been removed form the poultry part, the first guiding transfers to a second guiding for guiding the centering tube and the pusher rod back to their start position. While the centering tube and the pusher rod are displaced towards the meat stripper disc, the spring is compressed. As the centering tube and the pusher rod are returned to their start position along the second guiding, the displacement is controlled by the relaxation of the spring and takes place automatically, without having to exert any force to the pusher rod, after the removal of the meat from the bone has been completed.

Furthermore, the carrier and/or the socket preferably comprise a groove for receiving the poultry part, and each deboning unit comprises at least one travel rod which extends in cross direction of the chain for guiding the displacement of the guiding block and guiding the centering tube through the groove of the carrier from its first start to its first stop position, and preferably also guiding the pusher rod to its second end position. Upon the displacement of the bone pusher assembly, the front end of the centering tube is located close to the bottom of the groove to pick up the poultry part and displace it towards the meat stripper disc.

The deboning units may be mutually connected to form an endless chain. In that way there is no necessity to provide any chain or gear wheel, so that a device can be obtained with a reduced wearing. However, if so desired, the deboning units may still be mounted on one or more conveyor belts to form the endless chain.

The invention will be further illustrated in the figures and the description of the figures given below.

FIG. 1 is a schematic front view of the deboning device of the present invention. FIG. 1a is an elevated view of a part of FIG. 1.

FIG. 2 is a top view of the upper run of the deboning device of the present invention.

Figure 4A:
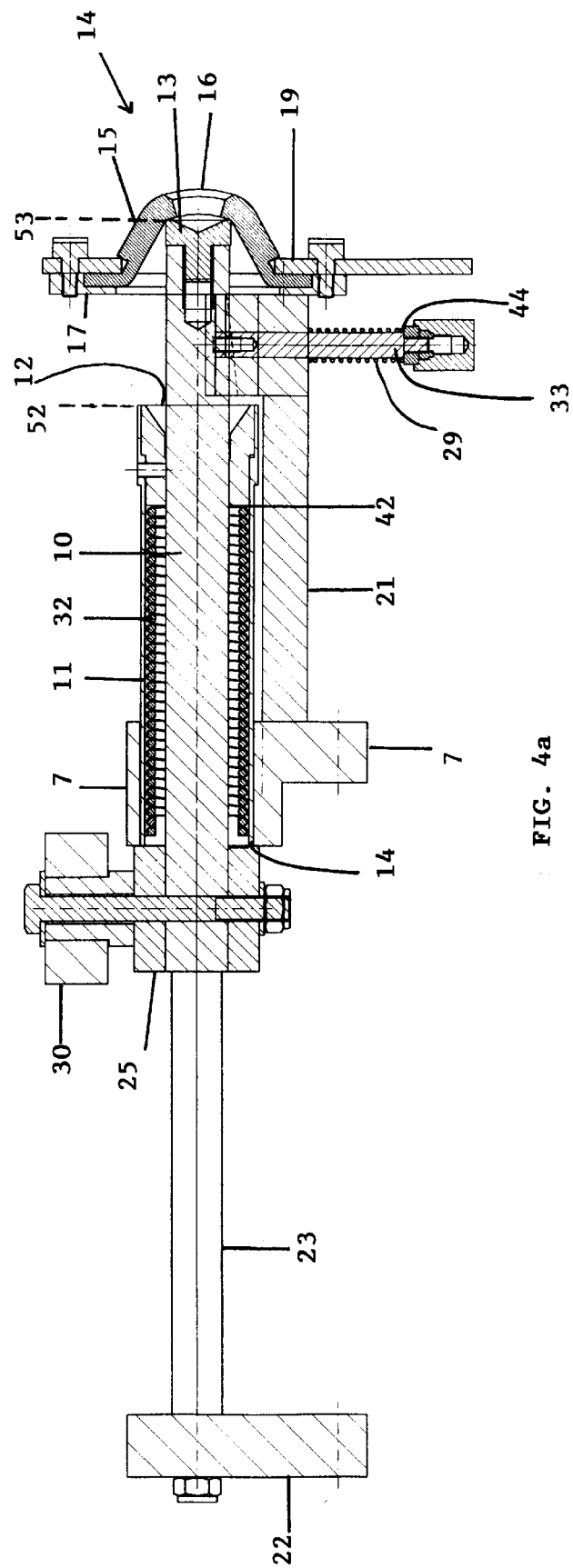

FIGS. 3a and 3b respectively are a top view and a cross section of a deboning unit, with the bone pusher assembly in its start position.

In FIG. 4a a deboning unit is shown with the bone pusher assembly in its end position.

The deboning device shown in FIG. 1 comprises an endless chain 9. The endless chain 9 is formed by a plurality of individual deboning units 1 that are mutually connected to each other, for example through links 41. The deboning units may for example also be mounted on a conveyor belt to form an endless chain. The endless chain 9 comprises an upper run, which is shown in FIG. 1, for moving the poultry parts from a loading position L, where poultry parts to be deboned are inserted in the deboning units 1, towards a deboning position 35, and a lower run for returning empty deboning units 1 from the deboning position 35 to the loading position L. The deboning units 1 extend in cross direction of the endless chain 9. After the poultry parts have been deboned, the meat is collected in a meat collector 8, the bones are collected in a bone collector.

The deboning unit 1 shown in FIGS. 2a, 2b, 3a, 3b, 4a, comprises at a first end a meat stripper disc assembly 4, and at a second end opposite the first end, a terminal block 22. The terminal blocks of adjacent deboning units 1 may be mutually connected by means of links 41 so as to form the endless chain 9. Adjacent the meat stripper disc assembly 4, between the meat stripper disc assembly 4 and the terminal block 22, the deboning unit 1 comprises a carrier 2 for receiving the poultry part that needs to be deboned. At the side of the carrier 2 opposite the side facing the meat stripper disc assembly 4, a bone pusher assembly 24 is mounted for removing the bones from the poultry parts.

The carrier 2 can be made of various materials but is preferably made of a plastic material, so as to allow a simple shaping of the carrier and to allow the carrier 2 to be easily cleaned. In longitudinal direction of the carrier 2, a groove 3 is provided so as to facilitate the positioning of the poultry parts, especially with respect to the meat stripper disc assembly 4. At the end of the carrier 2 facing the meat stripper disc assembly 4, the carrier 2 comprises at least one recess or hole 18 wherein a socket 5 is slideably mounted. Thereto the socket 5 comprises at least one downwardly protruding pin 33, which extends through the hole 18. The pin 33 is surrounded by a spring 29 which is fixed between the lower end 44 of the pin 33 and the underside 21 of the carrier 2. The slideable mounting may however also be carried out in any other way known to the man skilled in the art. The socket has an upright rim 31 at the side opposite the meat stripper disc assembly 4. The socket 5 comprises a groove 6, which connects to the groove 3 of the carrier 2 and which tapers towards the meat stripper disc assembly 4 so as to guide the poultry parts towards the meat stripper disc 15.

The meat stripper disc assembly 4 comprises a flexible meat stripper disc 15, with a more or less central aperture 16 for scraping the meat from the bone, through which the bones are displaced. The meat stripper disc 15 is mounted in a frame, which preferably comprises a first ring 17, which is attached to the carrier 2 and a second ring 19 attached to the first ring 17. The meat stripper disc 15 is preferably a membrane which is made of a strong, but flexible resilient material, for example a rubber. The aperture 16 of the meat stripper disc 15 has a diameter that is smaller than the average diameter of te bones of the legs to be deboned.

The bone pusher assembly 24 comprises a co-operating hollow centering tube 11 for picking up the poultry part and guiding the poultry part towards the meat stripper disc assembly 4. The bone pusher assembly also comprises a pusher rod 10 which is slideably mounted within the centering tube 11, to force the bone through the aperture 16 of the meat stripper disc 15. At least part of the pusher rod 10 is positioned within the centering tube 11. The centering tube 11 is preferably approximately cylindrical and has an open front end 12 so as to allow the front end 13 of the pusher rod 10 to be moved in and out of the centering tube 11. The open front end 12 of the centering tube 11 tapers towards the inside of the tube. The tapering part 40 is preferably made of a plastic material.

The front end 13 of the pusher rod 10 is preferably closed, and tapers towards the inside of the pusher rod. The front ends 12, 13 of both the centering tube 11 and the pusher rod 10 are provided to receive the large knuckle of the bone of the poultry part. The front end 13 of the pusher rod 10 has preferably a rough surface so as to improve the gripping of the bone. Thereto, the front end may comprise one or more pins or the like, that are capable of protruding into the knuckle. The pusher rod 10 may comprise an additionally extendible part 47, which may be extendible to a position beyond the aperture 16 of the meat stripper disc 15, but is preferably extendible to a position within the aperture 16, so as to allow also parts with more fragile bones to be deboned, and to facilitate the complete deboning of the poultry part.

The centering tube 11 and pusher rod 10 are preferably slideably moveable from a first position S1 to a second position S2, which is the end position of the centering tube. From S2 the pusher rod 10 is further slideably moveable to a position S3 wherein the meat stripper disc 15 is stretched in the moving direction of the pusher rod 10 as is shown in FIG. 4a.

The means for guiding the bone pusher assembly 24, thus the centering tube 11 and pusher rod 10, during their displacement from a start position S1 to an end position S2, S3 comprise a guiding block 25 which is slideably mounted on at least one travel rod 23. The travel rods 23 extend between the fixed terminal block 22 and a fixed second block 7, which is mounted between the terminal block 22 and the meat stripper disc assembly 4, preferably between the terminal block 22 and the carrier 2. The guiding block 25 comprises at least one hole 45 for allowing the guiding block 25 to slide over the travel rods 23. The back end of the pusher rod 10 is connected to the guiding block 25, for example by means of the screw 46. The pusher rod 10 is at least partly, preferably approximately entirely surrounded by a spring 32, which is clamped between the wall 26 of the guiding block 25, and a rim 42 close to the front end of the centering tube 11. The spring 32 may partly extend in the centering tube 11. The guiding block 25 is provided to be moveable between a first position in contact with the terminal block 22 shown in FIG. 3a, and a second position in the vicinity of the second block 7, shown in FIG. 4a. In the start position of the guiding block 25 and the bone pusher assembly 24, the spring 32 is in a non compressed or less compressed state. During the displacement of the bone pusher assembly 24 and the guiding block 25, the spring 32 is gradually compressed.

The second block 7 is preferably connected to the second end of the carrier 2 opposite the meat stripper disc assembly 4. In the second block 7, a hole 14 may be provided for guiding the centering tube 11 during its displacement between the start position S1 and the end position S2, throughout the hole 14. The terminal block 22 is connected to the second block 7 through at least one travel rod 23 along which the guiding block 25 is moved upon deboning.

The means for guiding the pusher assembly 24 upon deboning further comprise a first guiding 27 positioned at the deboning position 35. The first guiding 27 is provided to co-operate with the guiding block 25, preferably with means or a wheel, pin 30 or any other means known to the man skilled in the art, which is connected to the guiding block 25. The first guiding 27 is provided to drive the wheel 30 and the guiding block 25 from their start position shown in FIG. 2a and 3a to their end position, shown in FIGS. 2a and 4a. The guiding block 25 is provided to co-operate with the centering tube 11, for moving the centering tube 11 and the pusher rod 10 from their start position S to the end position S2 of the centering tube. Simultaneously, the spring 32 is compressed. The end position of the centering tube 11 corresponds to the position where the front end 12 of the centering tube contacts the upright rim 31 of the socket 5. The guiding block 25 is provided for further moving the pusher rod 10 from the end position S2 of the centering tube 11 to the end position S3 of the pusher rod 10 whereby the meat stripper disc 15 is elastically deformed as is shown in FIG. 4b and the spring 32 is virtually completely compressed. The pusher rod 10 is preferably mounted in the centering tube 11 in such a way that the centering tube 11 and the pusher rod 10 are simultaneously displaced from the position S1 to the position S2 in the direction of the meat stripper disc assembly 4. At the position S2 the centering tube 11 has reached its closest position with respect to the meat stripper disc assembly 4. From the position S2 on, the pusher rod 10 is slideable within the centering tube 11 to a final position S3 in contact with the meat stripper disc 15, whereby the meat stripper disc 15 is elastically deformed in the moving direction of the bone pusher assembly 24.

At the position where the pusher rod 10 contacts and has deformed the meat stripper disc 15, the first guiding 27 transfers into a second guiding 34 for guiding the pusher rod 10 and centering tube 11 back to their start position. The displacement of the pusher rod 10 and centering tube 11 proceed automatically by the action of the spring 32 which is released.

The deboning device of this invention also comprises in the vicinity of the deboning position 35, means 20 for adjusting the position of the socket 5 and the aperture 16 in the meat stripper disc assembly 4 with respect to each other, in height direction H of the deboning unit 1 so as to allow a proper deboning of the poultry parts, independent of the size of the parts. Thereto, the socket 5 is attached to the underside 21 of the carrier 2 by means of a compressible spring 29. The means for adjusting the position in height direction comprise a third guiding 38 which is provided to co-operate with the springs 29 and compress the springs 29 so as to force the socket 5 to be moved in height direction of the deboning unit 1. In that way the position of the aperture 16 in height direction can be adapted to the size of the poultry parts that need be deboned.

The deboning device of this invention may further comprise at a position upstream the deboning position 35 of the processing path, a fourth guiding 28 for displacing the socket 5 in height direction of the deboning unit 1 so as to force the meat to leave the carrier 2. The deboning device may also comprise at a position upstream the deboning position 35 of the processing path, means 39 preferably a paddle wheel, for picking up the meat from the carrier 1 and transporting the meat towards a meat collector 8.

The deboning device of the present invention mainly operates as follows.

After the poultry part to be deboned has been loaded into a carrier 2 at the loading position L, the carrier 2 is further moved in the direction of the arrow in FIGS. 1 and 2 to the deboning position 35. The bone centering tube 11 is in its retracted position, the bone pusher rod 10 is contained within the centering tube 11. At the deboning position 35, the wheel 30 engages the first guiding 27 and is moved simultaneously with the guiding block 25 in the direction of the meat stripper disc assembly 4, over the travel rods 23 as a guiding. The centering tube 11 and the pusher rod 10 are simultaneously advanced towards the meat stripper disc assembly 4, from a first position S1 to a second position S2, while the front end of the centering tube 11 is positioned close to the bottom of the groove 3 and 6 of respectively the carrier 2 and socket 5 to pick up the poultry part, and while engaging the large knuckle of the poultry part to be deboned. Thereby, the displacement of the centering tube is guided by the hole 14 in the second block 7 and by the groove 3 in the carrier 2. Simultaneously the spring 32 is compressed.

As the centering tube 11 is moved towards the meat stripper disc assembly 4, the socket 5 is displaced in height direction of the deboning unit 1 by the third guiding 38, the bone of the poultry part is pushed towards and possibly already through the aperture 16 in the meat stripper disc 15, while the meat remains in the carrier 2. At the position S2, the centering tube 11 contacts the socket 5 and is stopped by the upright rim 31 of the socket 5. At that position S2, the wheel 30 and guiding block 25 are moved further towards the meat stripper assembly 4, while simultaneously taking along the pusher rod 10 and further compressing the spring 32. Thereby the front end 13 of the pusher rod 10 engages the large knuckle of the poultry part to be deboned, and the bone is further advanced through the aperture 16. The pusher rod 10 is further moved until its front end 13 reaches the end position S3 where the flexible meat stripper disc 15 is deformed in forward direction of the displacement of the pusher rod 10 and the bone has been pushed substantially completely through the aperture 16 in the meat stripper disc 15. Preferably, at that position, the extendible part 47 of the pusher rod 47 is extended to a postion within the aperture 16 of the meat stripper disc 15.

As can be seen from FIG. 2a, at the position S3, the wheel 30 transfers from the first guiding 27 for displacing the bone pusher assembly 24 towards the meat stripper disc assembly 4, to the second guiding 34 for guiding the bone pusher assembly 24 back to its start position S1. Because at that position, the force compressing the spring 32 is released, the spring 32 is relaxed and the pusher rod 10 is moved in backward direction along the second guiding 34 to the position S1. As the pusher rod 10 reaches the position S2, it takes the centering tube 11 along and is further moved in backward direction to the position S1. Simultaneously with the retraction of the pusher rod 10, the deformation of the flexible meat stripper disc 15 is removed, the aperture 16 in the meat stripper disc is moved over the bone in backward direction thus completing the removal of any remaining meat on the bone. As the bone leaves the aperture 16 of the meat stripper disc, and the carrier 2 is forwarded along the processing path, the bone is rotated out of the aperture 16 by means of the first obstruction 36. The second obstruction 37 or cutting means ensure that in case any ligands remain, the meat and bone are torn apart. As the bone pusher assembly leaves the first guiding 27, the socket 5 may leave the third guiding 38 and be lowered to its original position. After the poultry parts have been deboned, the meat needs to be removed from the carrier as is shown in the right part of FIG. 1 and in FIG. 1a. Thereto, the socket 5 is displaced in height direction of the deboning unit 1 by a fourth guiding 28, which compresses spring 29 and displaces socket 5. The meat may be further picked up by a paddle wheel 39.

I claim:

1. A deboning device for separating bone and meat of poultry parts, said device comprising a plurality of deboning units (1) mounted along an endless chain (9), which endless chain (9) is provided to be moved in longitudinal direction along a processing path, whereby each deboning unit (1) extends in cross direction of the endless chain (9) and comprises at a first end a meat stripper disc assembly (4)

with a meat stripper disc (15), which meat stripper disc (15) contains an aperture (16) for receiving the bone of the poultry part therethrough in longitudinal direction of the bone and stripping the meat from the bone, which deboning unit (1) comprises at a second end opposite said first end, a bone pusher assembly (24) for displacing the bone towards and through the aperture (16) of the meat stripper disc (15), which deboning unit (1) comprises at a side facing the meat stripper disc (15) a carrier (2) for carrying the poultry part to be deboned, which deboning device further comprises means (27) for guiding the bone pusher assembly (24) towards the meat stripper disc (15) into engagement with the poultry part, characterized in that the deboning device comprises at least one deboning position (35), which deboning position (35) comprises the means (27) for guiding the bone pusher assembly (24) towards the meat stripper disc (15), which meat stripper disc (15) is made of a flexible material, in which bone pusher assembly (24) a pusher rod (10) is slideably mounted, which pusher rod (10) has a front end (13) with a diameter that is larger than the diameter of the aperture (16) of the meat stripper disc (15), which pusher rod (10) is provided to co-operate with the means (27) for moving the pusher rod (10) to a position where the front end (13) of the pusher rod (10) is in contact with the meat stripper disc (15) and the meat stripper disc (15) is elastically deformed in such a way that part of it extends beyond the meat stripper disc assembly (4) and the bone is displaced substantially completely through the aperture (16) of the meat stripper disc (15), whereby the deboning device comprises at a position in the vicinity of and upstream the deboning position (35), a first obstruction (36) which is positioned in a direction substantially perpendicular to the processing path for stopping the bone after it has been displaced substantially completely through the meat stripper disc (15) and forcing the bone to move out of the aperture (16) of the meat stripper disc (15).

2. A device as claimed in claim 1, characterised in that the deboning unit (1) comprises means (5, 29, 33, 38, 44) for adjusting the position of the poultry part and the meat stripper disc (15) with respect to each other in height direction of the deboning unit (1).

3. A device as claimed in claim 1, characterized in that the carrier (2) comprises in the vicinity of the meat stripper disc (15) a socket (5) for carrying the poultry part, in which socket (5) a groove (6) is provided which tapers towards the meat stripper disc (15) for guiding the bone towards the aperture (16) in the meat stripper disc (15), which socket (5) is slideably mounted in said carrier (2) in height direction of the deboning unit (1).

4. A device as claimed in claim 3, characterized in that the deboning device comprises in the vicinity of the deboning position (35) a guiding (38) for displacing the socket (5) in height direction of the deboning unit (1).

5. A device as claimed in claim 1, characterised in that the bone pusher assembly (24) comprises a hollow centering tube (11) with a hollow inwardly tapering front end, whereby the pusher rod (10) is slideably mounted in the centering tube (11).

6. A device as claimed in claim 1, characterised in that the means for guiding the bone pusher assembly (24) towards the meat stripper disc assembly (4) comprise a first guiding (27) for guiding the centering tube (11) and the pusher rod (10) from a first start position (S1) to a first end position (S2), which corresponds to an upright rim provided at the socket (5) at an end opposite the end facing the meat stripper disc (15), and for guiding the pusher rod (10) from the first end (S2) position to a second end (S3) position whereby the meat stripper disc (15) is elastically deformed, whereafter the first guiding (27) transfers to a second guiding (34) for retracting the pusher rod (10) from the meat stripper disc (15).

7. A device as claimed in claim 1, characterised in that the pusher rod (10) comprises an extendible part (47) which is displaceable to a position within or beyond the aperture (16) of the meat stripper disc (15).

8. A device as claimed in claim 1, characterised in that the pusher rod has a front end, which tapers inwardly, the surface of which is roughened and/or comprises one or more pins.

9. A device as claimed in claim 1, characterized in that a second obstruction (37) is provided upstream of the processing path of the chain (9) for tearing any meat and/or tendons and/or ligaments remaining between the bone and the meat from the bone, said obstruction (37) being chosen from the group of a second obstruction, cutting means of a shearing blade or the like.

10. A device as claimed in claim 3, characterized in that at a position upstream the deboning position of the processing path, a guiding (28) is provided for displacing the socket (5) in height direction of the deboning unit (1) so as to force the meat to leave the carrier (2).

11. A device as claimed in claim 1, characterized in that at a position upstream the deboning position (35) of the processing path, means (39) are provided, preferably a paddle wheel for picking up the meat from the carrier (1) and transporting the meat towards a meat collector (8).

12. A device as claimed in claim 5, characterized in that the bone pusher assembly (24) comprises a guiding block (25) wherein the pusher rod (10) is held, which pusher rod (10) is surrounded over at least part of its length by a spring (32), which spring (32) is held between the guiding block (25) and the front rim (42) of the centering tube (11), which guiding means further comprise third means (30) connected to said guiding block (25), for co-operating with the first guiding (27) and the second guiding (34).

13. A device as claimed in claim 12, characterized in that the carrier (2) and/or the socket (5) comprise a groove (3) for receiving the poultry part and each deboning unit (1) comprises at least one travel rod (23) which extends in cross direction of the chain (9), for guiding the guiding block (25).

14. A device as claimed in claim 1, characterised in that the deboning units (1) are mutually connected to form an endless chain (9).

15. A device as claimed in claim 1, characterised in that the deboning units (1) are mounted on a conveyor belt.

* * * * *